United States Patent [19]

Spaulding et al.

[11] Patent Number: 5,553,199
[45] Date of Patent: Sep. 3, 1996

[54] METHOD AND APPARATUS FOR CALIBRATING A FOUR COLOR PRINTER

[75] Inventors: Kevin E. Spaulding, Spencerport; Douglas W. Couwenhoven; Rodney L. Miller, both of Fairport, all of N.Y.

[73] Assignee: Eastman Kodak Company, Rochester, N.Y.

[21] Appl. No.: 237,072

[22] Filed: May 3, 1994

[51] Int. Cl.[6] .................................................. G06K 15/00
[52] U.S. Cl. ........................... 395/109; 358/504; 358/518
[58] Field of Search ..................................... 395/109, 101, 395/131, 102, 112; 358/504, 501, 578, 577, 523

[56] References Cited

U.S. PATENT DOCUMENTS

| | | | |
|---|---|---|---|
| 4,275,413 | 6/1981 | Sakamoto et al. | 358/515 |
| 4,500,919 | 2/1985 | Schreiber | 358/518 |
| 4,929,978 | 5/1990 | Kanamori et al. | 355/38 |
| 5,031,034 | 7/1991 | Shimizu et al. | 358/529 |
| 5,121,196 | 6/1992 | Hung | 358/504 |
| 5,168,552 | 12/1992 | Vaughn et al. | 395/109 |
| 5,175,701 | 12/1992 | Newman et al. | 364/723 |
| 5,185,661 | 2/1993 | Ng | 358/505 |
| 5,196,927 | 3/1993 | Warner | 358/515 |
| 5,268,754 | 12/1993 | VandeCapelle et al. | 358/527 |
| 5,296,935 | 3/1994 | Bresler | 358/406 |
| 5,305,119 | 4/1994 | Rolleston et al. | 358/523 |
| 5,331,438 | 7/1994 | Harrington | 358/500 |
| 5,331,440 | 7/1994 | Kita et al. | 358/529 |
| 5,471,324 | 11/1995 | Rolleston | 358/518 |
| 5,475,800 | 12/1995 | Vaughn et al. | 395/109 |

OTHER PUBLICATIONS

Po–Chieh Hung, "Colorimetric calibration in electronic imaging devices using a look–up–table model and interpolations", pp. 53–61, *Journal of Electronic Imaging* 2(1), Jan. 1993.

K. Kanamori & H. Kotera, "Color Correction Technique for Hard Copies by 4–Neighbors Interpolation Method", pp. 73–80, *Journal of Imaging Science and Technology*, vol. 36, No. 1, Jan./Feb. 1992.

U.S. Ser. No. 08/068,823, Eastman Kodak Docket No. 66,875, "Method and Apparatus for Convex Interpolation For Color Calibration", by S. J. Wan, R. L. Miller, and J. R. Sullivan, filed May 28, 1993.

U.S. Ser. No. 08/068,887, Eastman Kodak Docket No. 67,464, "Method and Apparatus for Determining a Gamut Boundary and a Gamut Descriptor", by S. J. Wan, filed May 28, 1993.

*Primary Examiner*—Mark R. Powell
*Assistant Examiner*—Tracy M. Legree
*Attorney, Agent, or Firm*—Thomas H. Close

[57] ABSTRACT

A method of calibrating a four color printer capable of printing three colors and black, includes the steps of: forming a minimum black data structure representing a minimum black strategy; forming a maximum black data structure representing a maximum black strategy; for each printable black level, forming a fixed black data structure; and for a specific output color value, finding the minimum and maximum black levels using the minimum and maximum black data structures, determining a desired black level between the minimum and maximum black levels according to a defined black strategy, and determining the three printing color levels from the fixed black data structure corresponding to the desired black level.

13 Claims, 8 Drawing Sheets

METHOD AND APPARATUS FOR CALIBRATING A FOUR COLOR PRINTER

FIELD OF THE INVENTION

The present invention relates to the field of color calibration for digital imaging systems, and more particularly to a method for determining the colorant levels for a four-color printer (such as a CMYK printer) needed to produce a desired color value.

BACKGROUND OF THE INVENTION

In a digital color imaging system, a color image is represented as a set of color picture elements ("pixels"). Each pixel has associated with it a set of color values which describe the color (hue, saturation and lightness) for that position in the image. The color values correspond to the color coordinates in some given color space. There are many different color spaces (e.g. RGB, CIE tristimulus (XYZ), CIELAB, CIELUV, CMY(K), etc.) which are commonly used. Some color spaces, such as XYZ, CIELAB, and CIELUV are device independent and will therefore give an absolute measure of the color for each pixel in the image. Others, such as RGB and CMY(K), are device dependent and can only be related to an absolute color value if the spectral characteristics of the colorants produced by a specific device are known.

For many applications it is necessary to take color image data from one device having given spectral characteristics and display, manipulate, and/or print it on another device which may have very different spectral characteristics. For this reason, it is often necessary to be able to take image data in one color space, and convert it to a different color space. For example, it may be required to take RGB data from an input scanner and convert it to a device independent space such as CIELAB. This data in the device independent color space Can then be used by a variety of different output devices. The digital image data in the device independent color space is converted to the output device dependent color space for display on the output device. The various devices need to be calibrated so that the image will have the same color appearance regardless of what output device is used. As used herein, the term "calibrate" means to form a color transformation that converts color image data to an output device dependent color space.

To compute color transformations such as this, it is necessary to model the color reproduction characteristics of the input and output devices. For some types of devices, such as computer video displays, the models may involve fairly simple mathematical equations. However, for other devices such as color printers, the behavior may be quite complex and can be best characterized by printing a series of color patches with known input control values, and measuring the color which is produced.

Figure 1:
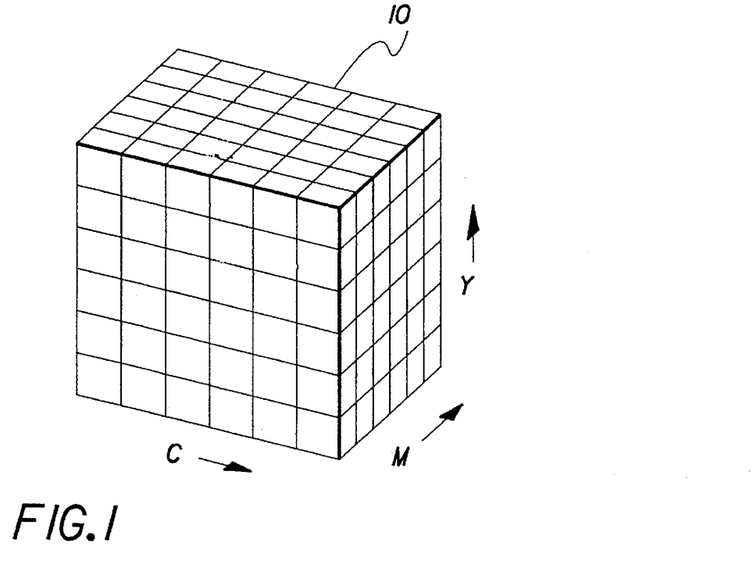
FIG. 1 shows a typical lattice of input control values for a 3-color printer.
Figure 2:
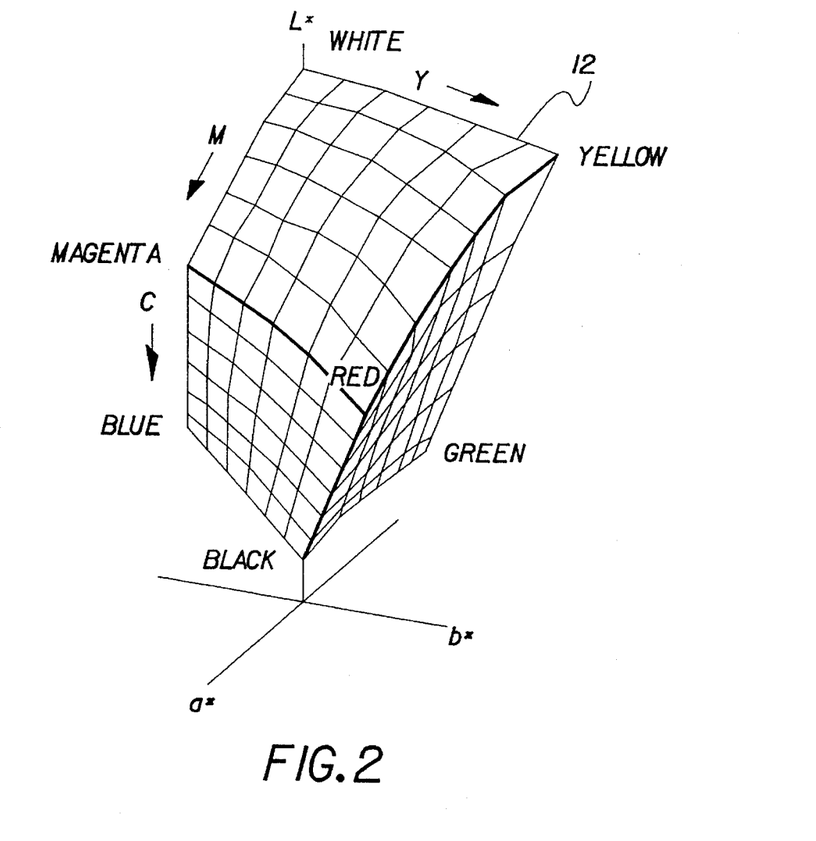
FIG. 2 shows the lattice of input control values in FIG. 1 mapped into CIELAB space.

Typically, a regular lattice 10 of device control values (e.g. CMY values) as shown in FIG. 1, is sent to the output device to generate an array of color patches. The color patches are then measured by a colorimeter or spectrophotometer to obtain measured color values. The measured color values will form a new lattice of points 12 in the desired calibration color space (such as CIELAB) as is shown in FIG. 2. The measured data points can then be used to approximate the device response for intermediate control values which were not measured using various interpolation techniques, such as tri-linear interpolation, or convex interpolation as is shown in U.S. patent application Ser. No. 068,823, filed May, 1993 in the names of Shijie J. Wan, Rodney L. Miller and James R. Sullivan for "Method for Convex Interpolation for Color Calibration". The measured data points in combination with an interpolation method as described above are referred to as a "Device Model". Device models like this which convert from the device control signal space (e.g. cyan, magenta, and yellow—CMY) to some device independent color space (such as CIELAB) are referred to herein as "forward models". The volume enclosed by the lattice of points 12 in FIG. 2 represents the colors which can be reproduced on the device, and is referred to as the color gamut of the device. The term gamut boundary refers to the surface of this color gamut volume.

Figure 3:
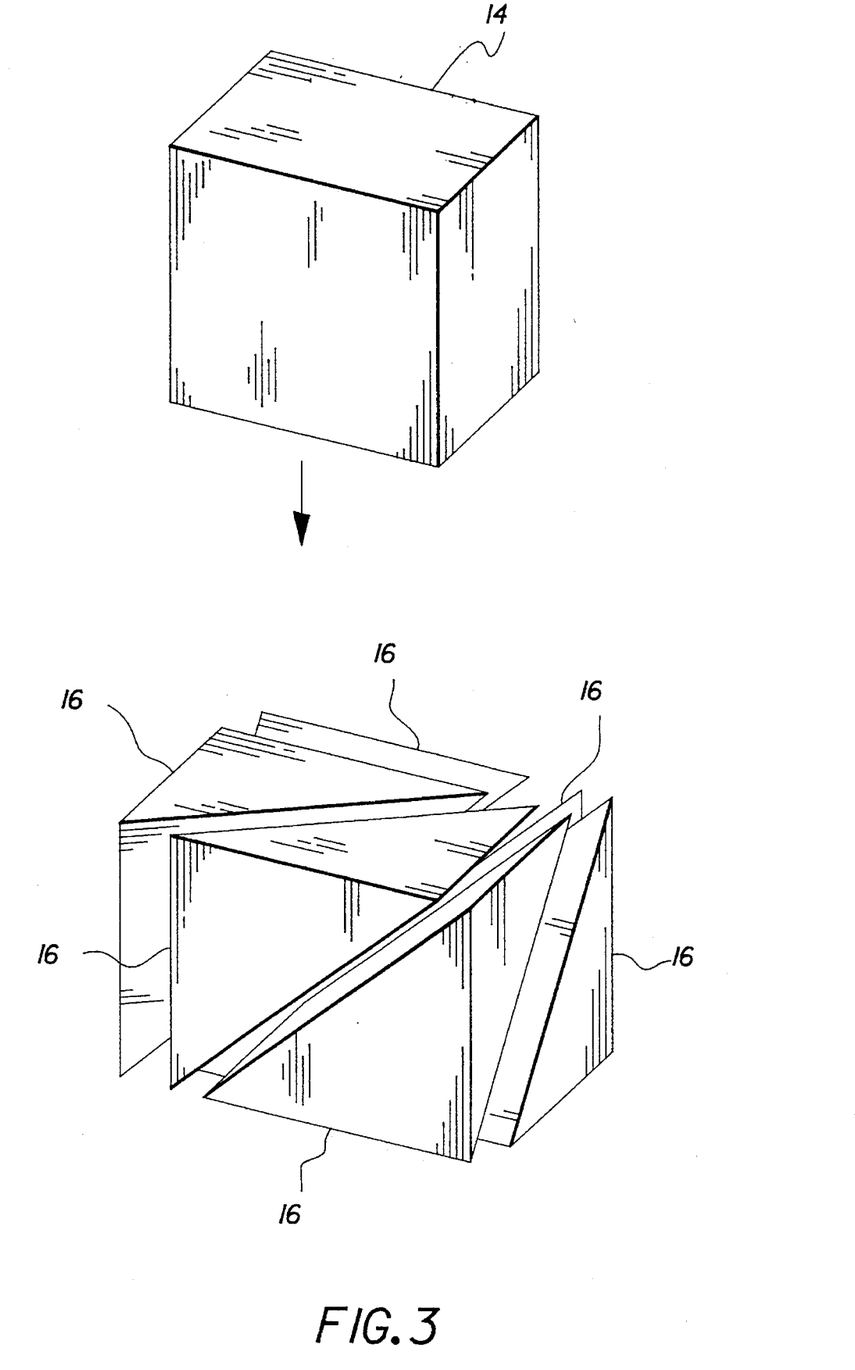
FIG. 3 is a diagram illustrating how a lattice cube can be sub-divided into 6 tetrahedrons.

Device models which compute the device control signals necessary to produce some particular device independent color value are often referred to as "inverse models". For 3-color devices, there is generally a one-to-one mapping between colors in the device control signal space, and colors in the device independent (output) color space. As a result it is possible to uniquely determine an inverse model for some device for colors which are inside the gamut of printable colors. Various inverse interpolation techniques have been developed to compute inverse models for 3-color devices from the measured device characteristics. One common method is to break each "cube" 14 in the lattice of input control values for the measured data up into six tetrahedrons 16. One common geometry used to form the tetrahedrons is shown in FIG. 3. Corresponding tetrahedrons are also formed in the lattice of output color values. A list of these tetrahedra are stored in a data structure containing the input and output color values corresponding to each corner of the tetrahedra. To determine the inverse mapping for a given output color, the data structure is searched for the tetrahedron in the output color space which contains the specified output color. The corresponding input color value can then be determined by interpolating between the input color values for the corresponding tetrahedron in the input control value space. Since the search process involved with this method can be somewhat time-consuming, it is often desirable to use this technique to determine the inverse mapping for a regular lattice of color values in the output color space to form an inverse Look-up Table (LUT). Simpler interpolation techniques, such as tri-linear interpolation, can then be used to process large numbers of image pixels through the inverse LUT quickly.

Figure 4:
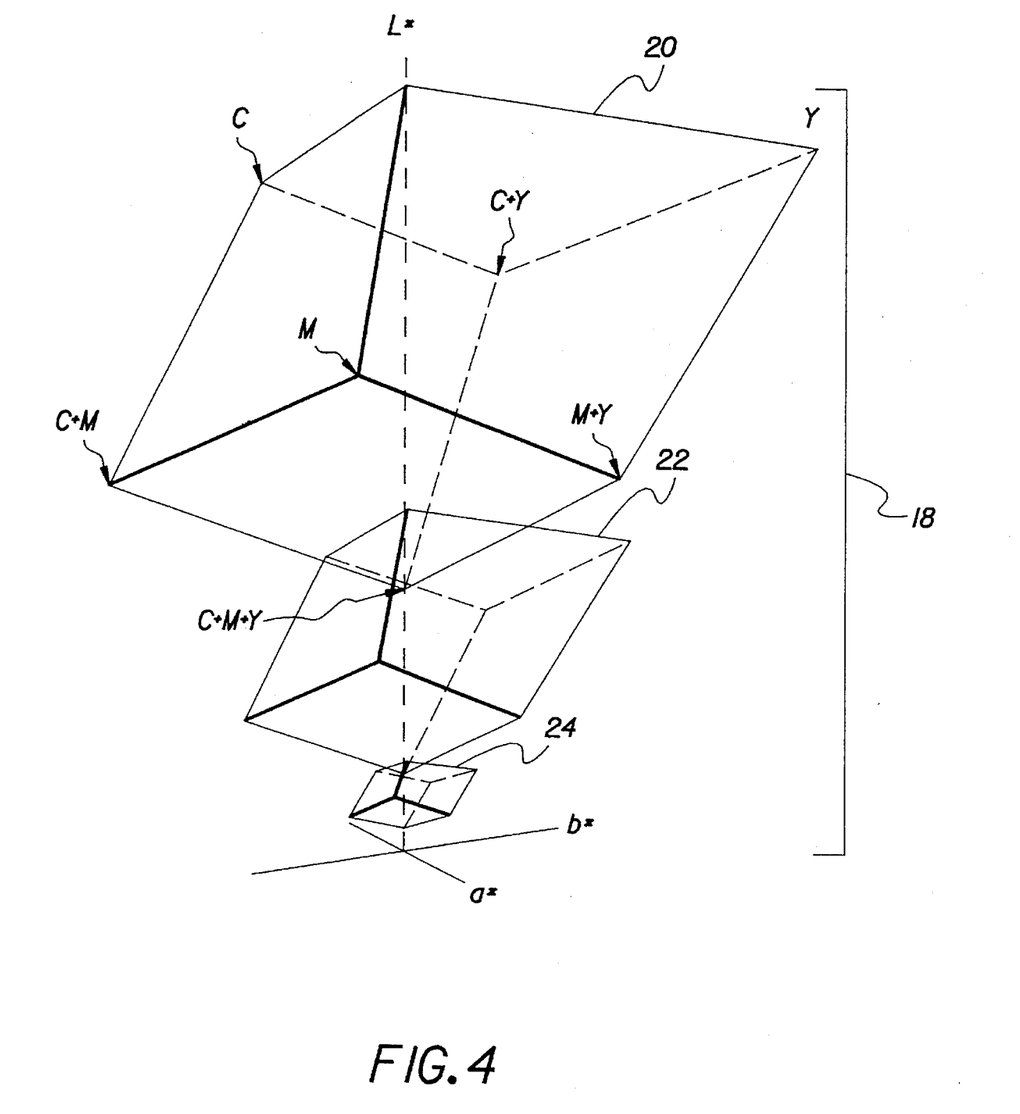
FIG. 4 shows color gamuts for several different black levels for a 4-color printer.

For four-color (e.g. cyan, magenta, yellow and black-CMYK) output devices, the problem of determining an inverse LUT is complicated due to the fact that many sets of input control values may map to a single output color. FIG. 4 shows a typical color gamut 18 of a 4-color device for several different black levels. The total color gamut comprises a plurality of gamut volumes, one for each black level. For example, the gamut volume 20 represents no black, the volume 22 represents 50% black, and the volume 24 represents full black. The vertices of the no black gamut volume are labeled with the initial of the subtractive primary color(s) C,M,Y that produced the color value at the vertex.

Each of the gamut volumes is similar to the color gamut of a 3-color device, and is generated by holding the black level constant and varying the cyan, magenta, and yellow colorant levels over their full range. Although, only 3 black levels are shown in this figure, there will usually be 256 or more black levels available to the device. The union of the color gamut volumes for all of the available black levels will represent the overall color gamut 18 of the device.

Figure 5:
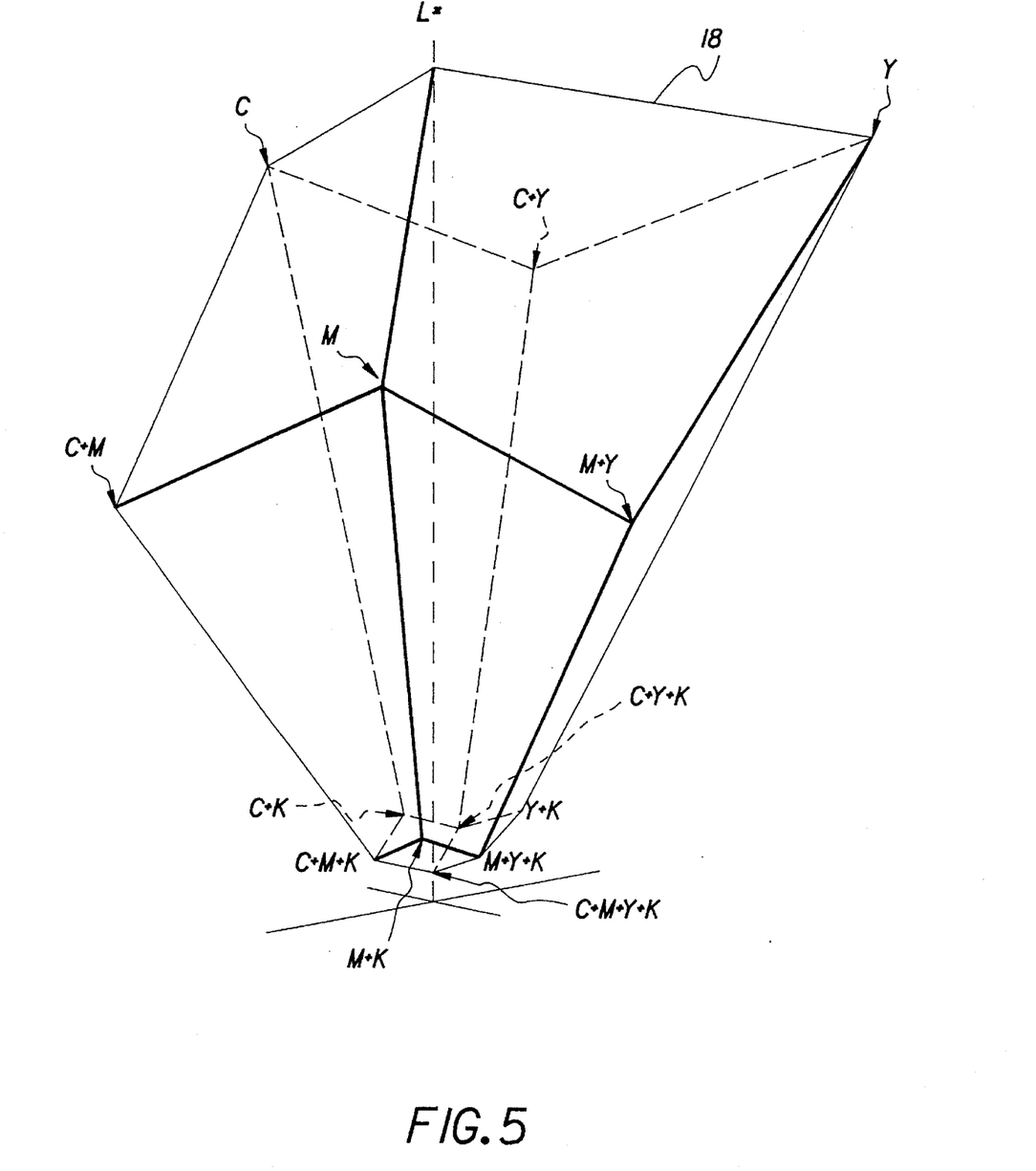
FIG. 5 shows the overall color gamut for a 4-color printer.

FIG. 5 shows the overall color gamut 18 for the example given in FIG. 4 where the vertices are labeled by the primary color C,M,Y,K or combination thereof that produced the color value at the vertex. Colors on the surface of the gamut can only be reproduced with a unique combination of CMYK colorant levels, but colors in the interior of the gamut can be reproduced using a variety of CMYK combinations corresponding to different black levels. There is therefore no unique solution to the inverse problem where it is desired to find the colorant levels necessary to produce a given output color. A number of methods have been developed to determine appropriate combinations of colorant levels to produce the desired output color value. Generically, these methods are referred to as "black strategies". In the graphic arts field, they are also known as gray-component removal (GCR) or under color removal (UCR) methods. The methods vary widely in speed, accuracy, and complexity and represent various trade-offs between these properties. Typical examples of these methods include interactive search techniques, global polynomial fits of measured device data, and empirical relationships which involve computing CMY colorant levels for a 3-color device and replacing some of the colorants with black when all three colorants are present.

The basis of many black component strategies for 4-color printers is the determination of the minimum and/or maximum black levels which can be used to produce the desired output color. Most prior art methods for determining these values are either iterative in nature and as a result computationally slow, or involve a polynomial fit or some other type of approximation to the known device characteristics.

Thus it can be seen that there is presently a need for a new calibration method for 4-color CMYK devices which is simultaneously fast, simple, accurate, and supports a variety of black strategies.

SUMMARY OF THE INVENTION

The present invention provides a method of calibrating a four color printer capable of printing three colors and black, comprising the steps of: forming a minimum black data structure representing a minimum black strategy; forming a maximum black data structure representing a maximum black strategy; for each printable black level, forming a fixed black data structure; and for a specific output color value, finding the minimum and maximum black levels using the minimum and maximum black data structures, determining a desired black level between the minimum and maximum black levels according to a defined black strategy, and determining the three printing color levels from the fixed black data structure corresponding to the desired black level.

This method can be used to process color image values directly, or to form an inverse look-up table which can be used with conventional forward interpolation techniques.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 6:
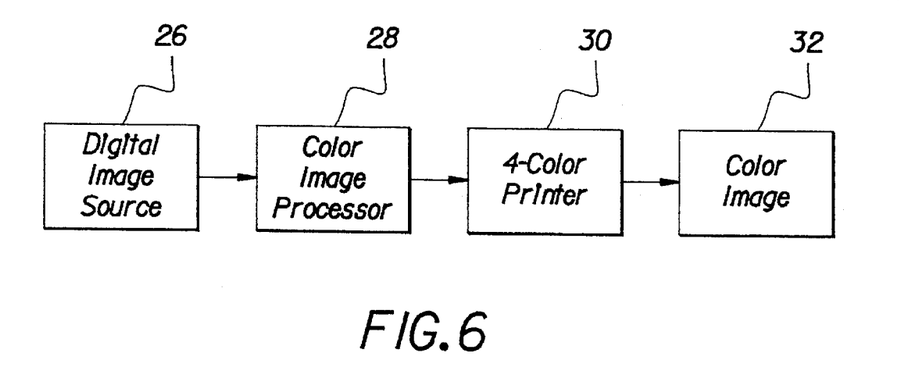
FIG. 6 is a block diagram showing a typical hardware system configuration for practicing the present invention.
Figure 7:
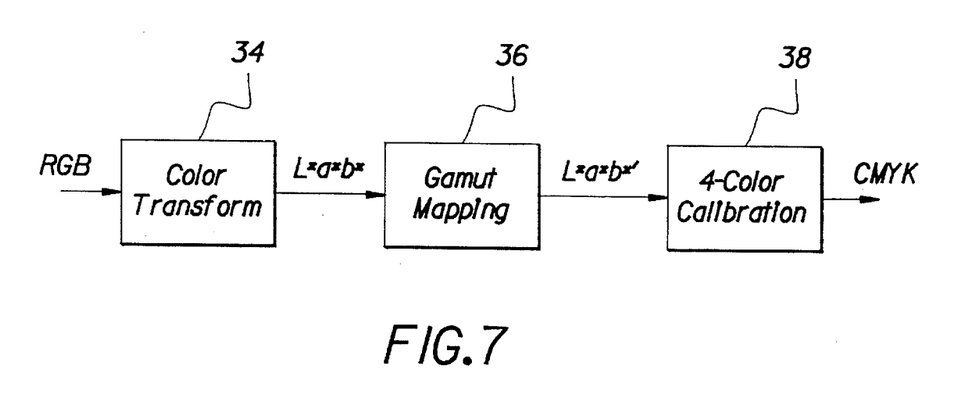
FIG. 7 is a flow chart showing the typical steps employed in transferring a color digital image from an input device dependent color space to an output device dependent color space.

Referring now to FIG. 6, a generic hardware system for practicing the present invention will be described. The system includes a source 26 of a color digital image such as a color scanner, or a digital electronic color camera. The color digital image produced by the source 16 is typically in an input device dependent color space RGB. A color image processor 28 receives the digital color image RGB, and transforms it into a four color output device dependent color digital image CMYK. The output device dependent digital color image CMYK is supplied to a four color output device 30 to produce a color image 32. The processing that takes place in the color image processor 28 is generally shown in FIG. 7. First, the input device dependent color image RGB is transformed (34) to a device independent digital color image such as LAB. Next, the device independent digital image is mapped (36) to a modified device independent digital image signal LAB' to account for any color gamut adjustments required, since the color gamut of the output device may not encompass the color gamut of the image source. Finally, the modified device independent digital image signal LAB' is transformed in a four color calibration step (38) to the four color output device dependent color space CMYK. The present invention is directed to this last step (38). In practice, steps 34, 36, and 38 may be combined into a single transform when implementing this method in a specific system.

In the present invention, the minimum and/or maximum black levels are calculated both quickly and accurately by reducing the 4-dimensional inverse problem to a set of 3-dimensional inverse problems which are absent from the ambiguities associated with the many-to-one mapping inherent to 4-color printers.

First consider the case where the minimum black value is desired. Each output color value within the color gamut of the 4-color printer will map uniquely to a single combination of CMY input control values where the removal of any more black would make it impossible to produce the specified output color value. It follows that any output color which can be made with no black component has a minimum black value of zero. The set of output color values which can be produced with no black will correspond to the 3-dimensional lattice of input coordinates where the black level is zero. This subset of points will form the sub-gamut shown in FIG. 4 for the "no-black" case. If the specified output color is within this sub-gamut, the input values associated with the minimum black strategy can be computed by simply performing conventional 3-dimensional inverse interpolation using established techniques.

Output color values corresponding to colors outside of this sub-gamut, but inside the overall color gamut can similarly be handled by forming three additional sub-gamuts corresponding to the volumes where one of the three remaining inputs values are maximized. Taken with the no-black sub-gamut, these three sub-gamuts will fill the overall gamut in a non-overlapping manner as shown graphically in FIG. 8, where the no black sub-gamut is labeled 40, the full cyan sub-gamut is labeled 42, the full magenta sub-gamut is labeled 44, and the full yellow sub-gamut is labeled 46. Each of these individual sub-gamuts is effectively a 3-dimensional data set since one of the input values is held constant in each case. For example, in the "full-cyan" sub-gamut 42, the cyan value will be at its maximum level and the other three components (magenta, yellow, and black) will vary across their entire range to form a 3-dimensional lattice of input values. It can be seen therefore, that the input values corresponding to the lattice points in each of these sub-gamuts will correspond to the minimum black level required to produce the corresponding output color. Since the sub-gamuts are non-overlapping, any given output color value will only fall within only one of the four sub-gamuts (with the exception of points which lie on the common surface of two adjoining sub-gamuts). To compute the set of input values corresponding to the minimum black strategy, it is therefore necessary to determine which of the 4 sub-gamuts the specified output color value is within and perform conventional inverse interpolation on the appropriate 3-dimensional data set.

One of the conventional inverse interpolation techniques which is commonly used on 3-dimensional lattices of data is tetrahedral interpolation (a subset of convex interpolation). With this approach, each sub-cube of the 3-dimensional lattice is broken up into six tetrahedrons as was shown in FIG. 3 above. This is implemented by forming a data structure which stores the input and output color values for each corner of each tetrahedron which makes up the lattice. The inverse interpolation is then accomplished by finding the tetrahedron which encloses the specified output color value. To speed up the search process, an initial sorting procedure can be used to identify candidate tetrahedrons with output color values in the neighborhood of the specified output color value. Once the enclosing tetrahedron is identified, the corresponding input color value is determined by interpolating between the input color values associated with each corner of the tetrahedron.

A preferred embodiment of the present invention is to use inverse tetrahedral interpolation within the sub-gamut containing the output color value to determine the corresponding input color values. For implementation purposes it is possible to merge the data structures for the four sub-gamuts into a single data structure containing all of the tetrahedrons from each of the four sub-gamuts. This eliminates the need to determine which sub-gamut contains the desired output color value.

The input color values having the maximum black level are found in a similar manner. The four sub-gamuts that are used in this case correspond to the 3-dimensional lattice where the black value is maximum, and the 3-dimensional lattices where the other three color values are minimum. These sub-gamuts are illustrated graphically in FIG. 9, where the full black sub-gamut is labeled 48, the no cyan sub-gamut is labeled 50, the no magenta sub-gamut is labeled 52, and the no yellow sub-gamut is labeled 54. Again, it is simply necessary to determine which of the four sub-gamuts contain the desired output color value, and then apply conventional inverse interpolation techniques. As with the minimum black strategy, a data structure is formed containing the tetrahedrons which make up each sub-gamut for the preferred embodiment of this invention.

Although the minimum and/or maximum black strategies are useful in themselves for some applications, it is desirable for other applications to use intermediate black strategies. Many of the black strategies which can be envisioned rely on knowing the minimum and/or maximum black values either to use in the computation of the desired black value, or to check the computed black value to make sure that it is in a valid range. One black strategy that we have implemented as a preferred embodiment of this invention is to specify a parameter in the range zero to one which represents the fractional black correction. The black value for a specified output color value is calculated by first finding the minimum and maximum black levels using the method of this invention described above. The actual black level, K, is then determined using the following equation:

$$K = K_{min} + f_K (K_{max} - K_{min}), \tag{1}$$

where $f_K$ is the fractional black correction, and $K_{min}$ and $K_{max}$ are the minimum and maximum black values, respectively. Once the black level is determined the other 3 input values (cyan, magenta, and yellow) are determined from the appropriate 3-dimensional data set. In the preferred implementation of this invention, tetrahedral data structures corresponding to the 3-dimensional data sets for every valid black level are formed as part of the initialization process. The data sets corresponding to black levels which are intermediate to the measured black values are computed by interpolating between the measured values. Typically about 256 different black levels can be produced on a printer, therefore 256 different data structures are required to access all of the black levels. Where $f_K=0$ or $f_K=1$, it is not necessary to compute the data structures for the intermediate black levels or the unused minimum or maximum black data structure.

Figure 8:
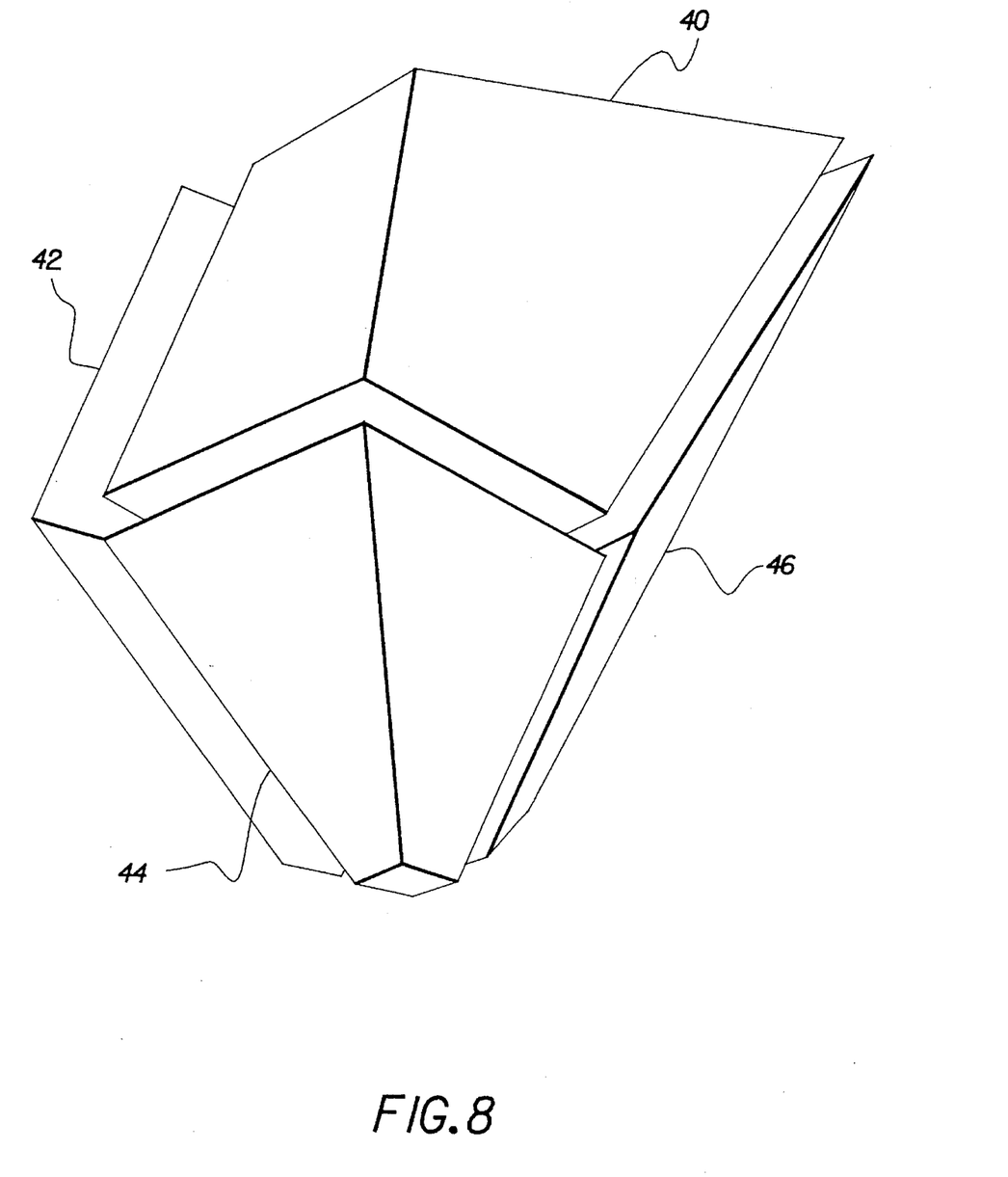
FIG. 8 shows how the color gamut is subdivided to form a data structure corresponding to a minimum black level strategy.
Figure 9:
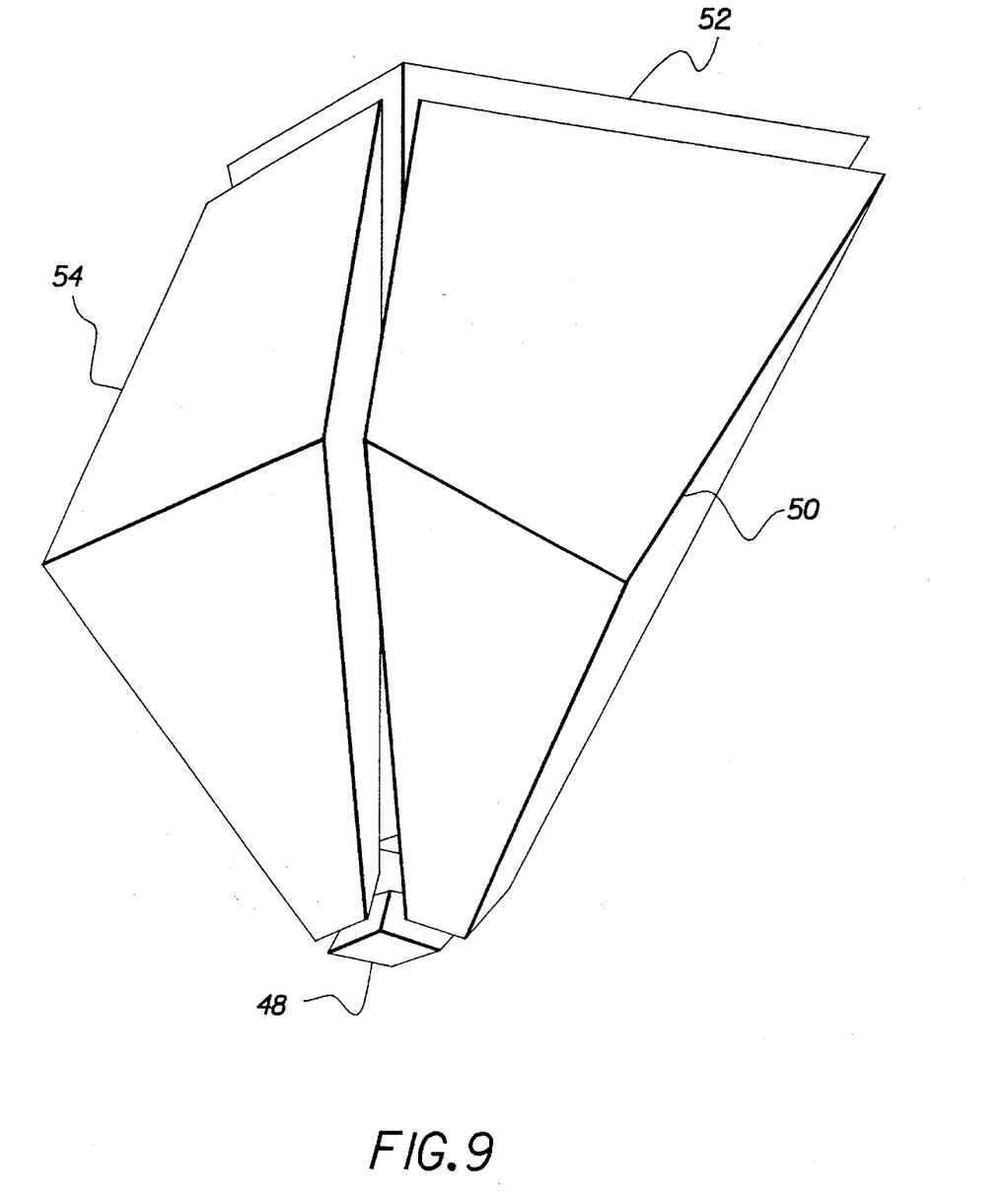
FIG. 9 shows how the color gamut is subdivided to form a data structure corresponding to a maximum black level strategy.
Figure 10:
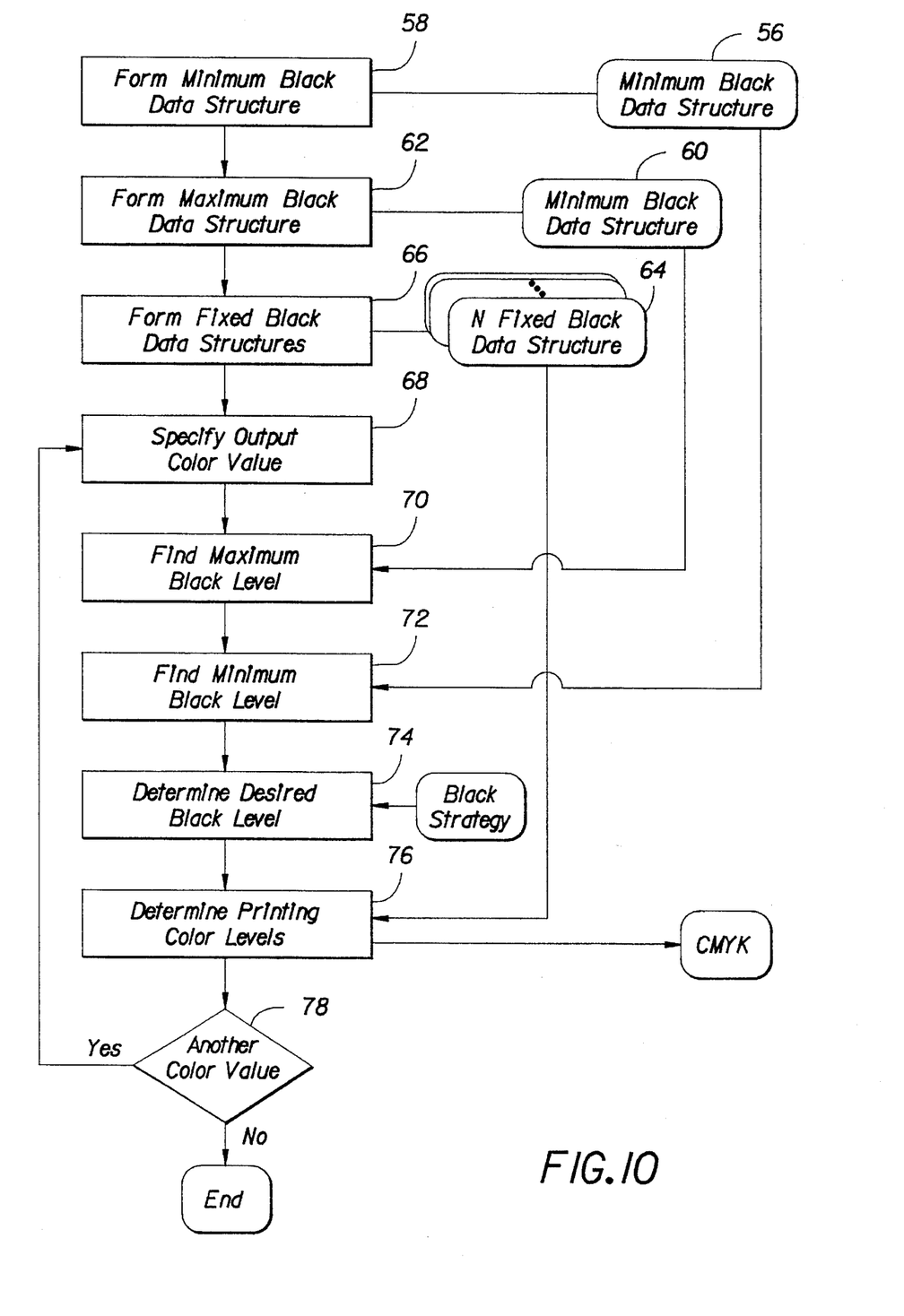
FIG. 10 is a flow chart illustrating the steps of the present invention.

The method of calibrating a four color printer according to the present invention will now be summarized with reference to FIG. 10. First, a minimum black data structure 56 using a minimum black strategy as shown in FIG. 8 above is formed (58). Next, a maximum black data structure 60 using a maximum black strategy as shown in FIG. 9 is formed (62). Then a set of N fixed black data structures 64 are formed (66), one for each different black level, by interpolation between the measured black values.

For a specified output color value (68), the maximum black level and the minimum black level are formed (70, 72) respectively, from the maximum 60 and minimum 56 black data structures. Employing the minimum and maximum black levels and a specified black strategy, a desired black level is determined (74). The desired black level is used to address the corresponding one of the N fixed black level data structures to determine the CMY colorant values (76). If another color value is to be processed, the method returns (78) to step (68) and repeats until all the input colors have been processed.

Other more complex black strategies can also be implemented using the fundamental method of the present invention described above. For example, it may be desirable to make the fractional black correction be a function of the desired output color, rather than a simple constant. With this flexibility one can implement color mappings which will implement black strategies like producing neutrals using maximum black levels, but producing more saturated colors with minimum black levels, etc. Another embodiment of this invention is to use an alternate method to estimate the black level (for example, making the amount of black a simple function of the desired color values) and use the present method to check that the black level is within the range of valid black levels. In general these variations can be summarized by making the desired black level be a function of the minimum and maximum black levels, as well as the desired color level, $$K = g(K_{min}, K_{max}, ABC), \qquad (2)$$

where g() represents some generalized function, and ABC is the desired output color value in the appropriate color space (RGB, XYZ, CIELAB, etc.).

It is assumed for any of the above implementations that the desired color value that is specified is inside the color gamut of the 4-color device (i.e. inside the volume shown in FIG. 5). Color values outside of this volume cannot be reproduced by the printer, and must therefore be mapped to points which are inside the printer gamut (see step (36) in FIG. 7). Various methods, such as the one described by Shijie J. Wan and Kevin Spaulding in U.S. application Ser. No. 08/230,958, "Method of Creating A Four Color Device Gamut Descriptor", filed April 1994, which is a continuation-in-part of U.S. application Ser. No. 068,887, filed May, 1993 can be used to characterize the surface of the color gamut, and can be used to test whether a specified color value is produceable for a given printer. Colors which are determined to be outside the gamut volume can then be clipped to a point on the surface of the gamut using a defined gamut clipping strategy. For this reason, it may be desirable to associate a data structure containing gamut boundary information with the data structures created for this invention for the purpose of checking the requested color value against the color gamut of the printer.

It is possible to use the method of this invention to directly process pixels of a color image, but for speed and memory reasons it is often desirable to instead use this technique to compute an inverse look-up table. The inverse look-up table will typically consist of a regular lattice of points in the output color space (CIELAB for example). In this case, the input values for each lattice node in the inverse look-up table are computed using the method of this invention with the appropriate black strategy. To process image pixels, the input color values are then computed using conventional forward interpolation techniques such as trilinear interpolation.

The method of the present invention is extended to systems which employ N colors, where N is more than four, by dividing the gamut into M sub-gamuts which are constructed using any four of the N colors. For example, in a Hi-Fi color system having red, green, blue, cyan, magenta, yellow, and black colorants, the color gamut can be divided into four color sub gamuts made up of a common color (e.g. black) and three of the other colorants. Each one of these sub gamuts is then calibrated using the method of the present invention. To process a color value using this technique, the sub-gamuts containing the desired output color are identified and the method described above is used to determine a corresponding input color value. If more than one sub-gamut contains the output color value, an input color values is obtained for example by averaging among all of the input color values or by choosing any one of the input color values.

The invention has been described with reference to a preferred embodiment. However, it will be appreciated that variations and modifications can be effected by a person of ordinary skill in the art without departing from the scope of the invention.

Parts List 10 lattice of device control values in device dependent color space
12 lattice of measured color values in device independent color space
14 cube of input control values
16 six tetrahedrons forming cube 14
18 color gamut of 4-color device
20 gamut volume for no black
22 gamut volume for 50% black
24 gamut volume for full black
26 digital image source
28 color image processor
30 four color printer
32 color image
(34) color transform step
(36) gamut mapping step
(38) four color calibration step
40 no black sub-gamut
42 full cyan sub-gamut
44 full magenta sub-gamut
46 full yellow sub-gamut
48 full black sub-gamut
50 no cyan sub-gamut
52 no magenta sub-gamut
54 no yellow sub-gamut
56 minimum black data structure
(58) form minimum black data structure step
60 maximum black data structure
(62) form maximum black data structure step
64 N fixed black data structures
(66) form N fixed black data structures
(68) specify output color values step
(70) find maximum black level step
(72) find minimum black level step
(74) determine desired black level step
(76) determine CMY colorant levels from appropriate fixed black data structure step
(78) repeat step

We claim:

1. A method of calibrating a four color printer capable of printing three colors and black, comprising the steps of:
    a) forming a minimum black data structure representing a minimum black strategy;
    b) forming a maximum black data structure representing a maximum black strategy;
    c) for each printable black level, forming a fixed black data structure; and
    d) for a specific output color value:
        i) finding the minimum and maximum black levels using the minimum and maximum black data structures;

ii) determining a desired black level between the minimum and maximum black levels according to a defined black strategy; and iii) determining the three printing color levels from the fixed black data structure corresponding to the desired black level.

2. The method claimed in claim 1, wherein said steps of finding the minimum and maximum black levels, and determining the three printing color levels are performed using convex interpolation on the respective data structures.

3. The method claimed in claim 1, wherein said minimum black data structure includes a portion representing colors that can be produced with a minimum amount of black and three portions representing colors that can be produced with maximum levels of each of the three colors respectively.

4. The method claimed in claim 1, wherein said maximum black data structure includes a portion representing colors that can be produced with full black and three portions representing colors that can be produced with a minimum amount of each of the three colors respectively.

5. The method claimed in claim 1, wherein the desired black level is determined by:

$$K=K_{min}+f_K(K_{max}-K_{min}),$$

where K is the desired black level, $K_{min}$ and $K_{max}$ are the black levels determined by the minimum and maximum black strategy respectively, and $f_K$ is the desired fractional black correction between the minimum and maximum black levels in the range zero to one.

6. A method of calibrating a four color printer capable of printing three colors and black, comprising the steps of:

a) forming a data structure representing a minimum black strategy which includes a portion representing colors that can be produced with a minimum amount of black and three portions representing colors that can be produced with maximum levels of each of the three colors respectively; and b) for a specific output color value determining the black level and the three printing color levels from the data structure.

7. A method of calibrating a four color printer capable of printing three colors and black, comprising the steps of:

a) forming a data structure representing a maximum black strategy which includes a portion representing colors that can be produced with full black and three portions representing colors that can be produced with a minimum amount of each of the three colors respectively; and b) for a specific output color value determining the black level and the three printing color levels from the data structure.

8. A method of calibrating a four color printer capable of printing three colors and black, comprising the steps of:

a) forming a minimum black data structure representing a minimum black strategy;

b) forming a maximum black data structure representing a maximum black strategy;

c) for each printable black level, forming a fixed black data structure; and d) forming a look up table by performing the following steps on a regular lattice of output color values:

i) finding the minimum and maximum black levels using the minimum and maximum black data structures;

ii) determining a desired black level between the minimum and maximum black levels according to a defined black strategy; and iii) determining the three printing color levels from the fixed black data structure corresponding to the desired black level.

9. The method claimed in claim 8, further comprising the step of: processing the color value for each pixel of a digital image by interpolating between lattice points of the look up table.

10. Apparatus for calibrating a four color printer capable of printing three colors and black, comprising:

a) a memory containing a minimum black data structure representing a minimum black strategy, a maximum black data structure representing a maximum black strategy, and fixed black data structures for each printable black level;

b) means for processing a specific output color value to obtain a black level and color levels, including:

i) means for finding the minimum and maximum black levels using the minimum and maximum black data structures;

ii) means for determining a desired black level between the minimum and maximum black levels according to a defined black strategy; and iii) means for determining the three printing color levels from the fixed black data structure corresponding to the desired black level.

11. Apparatus for calibrating a four color printer, comprising:

a) a memory containing a lookup table produced by the following steps on a regular lattice of output color values:

i) finding the minimum and maximum black levels using the minimum and maximum black data structures where the minimum black data structure represents a minimum black strategy and the maximum black data structure represents a maximum black strategy;

ii) determining a desired black level between the minimum and maximum black levels according to a defined black strategy;

iii) determining the three printing color levels from the fixed black data structure, formed for each printable black level, corresponding to the desired black level; and b) means for processing the color value for each pixel of a digital image by interpolating between the lattice points of the look up table.

12. A method of calibrating an N color printer, where N is greater than or equal to four, comprising the steps of:

a) dividing the color gamut of the N color printer into a set of four color sub-gamuts;

b) for each of the sub-gamuts, i) forming a data structure where one of the colorants is at its minimal level;

ii) forming a data structure where said one colorant is at its maximal level;

iii) forming data structures for each printable level of said colorant;

c) for a specific output color value, i) identifying one or more sub-gamuts containing the output color value;

ii) determining the minimum and maximum levels of said one colorant for each of the identified sub-gamuts;

iii) determining the desired level of said one colorant between said minimum and maximum levels according to a defined strategy for each of the identified sub-gamuts, and determining the level of the other three color values for each of the identified sub-gamuts to produce a set of colorant levels for each identified sub-gamut; and iv) obtaining a final set of colorant levels from the colorant levels produced in the previous step.

13. The method of calibrating an N color printer claimed in claim 12, wherein the step of obtaining a final set of colorant levels comprises averaging the sets of colorant levels produced from said identified sub-gamuts.

* * * * *